United States Patent Office 3,524,355
Patented Aug. 18, 1970

3,524,355
GYROSCOPE CONSTRUCTIONS
Douglas Barnett and Ivan A. Duck, Watford, England, assignors to S. G. Brown Limited, Watford, England, a British company
Filed June 20, 1967, Ser. No. 647,548
Claims priority, application Great Britain, June 22, 1966, 27,799/66
Int. Cl. G01c *19/02*
U.S. Cl. 74—5                7 Claims

ABSTRACT OF THE DISCLOSURE

The disclosure is of a gyroscope rotor assembly intended for use as a dynamically tuned free rotor gyro. The assembly comprises mounting means and a rotor member surrounding a gimbal member which occupies the centre region of the assembly. The mounting means comprises a bridge rigidly connecting a pair of spaced mounting member between the gimbal and rotor members in a disc-like formation. The gimbal member is connected to the rotor member and to the mounting member respectively by first and second aligned pairs of flexural spring pivots, the pairs of pivots being aligned on orthogonal axes.

Figure 1:
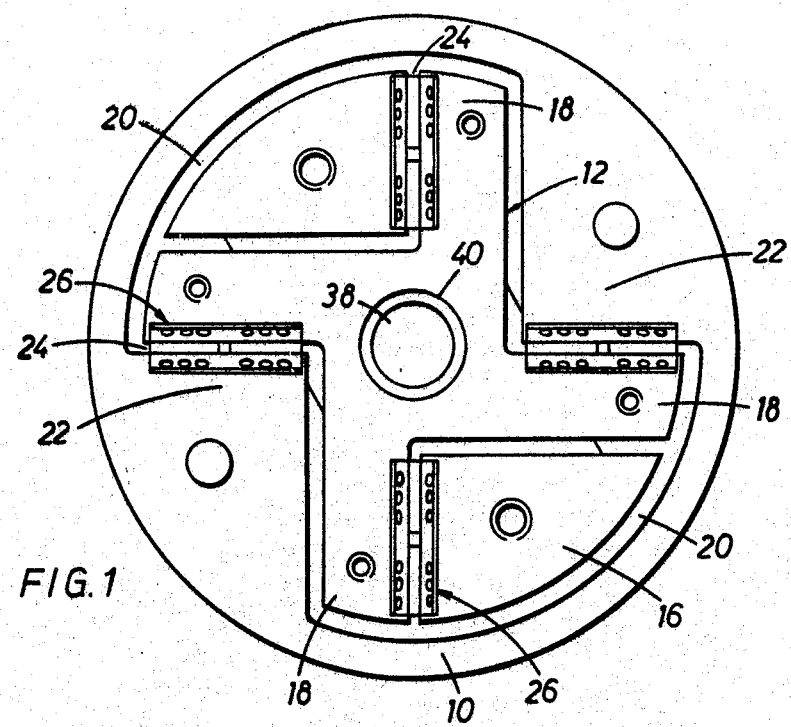

The rotor, gimbal and mounting members can be made from a single metal disc and the flexural spring pivots can be connected across slots in the disc before the slots are extended to separate the members.

---

This invention relates to gyroscope rotor assemblies.

In cognate U.S. application Ser. No. 529,751 and the recently filed continuation-in-part application based thereupon, there is disclosed and claimed a gyro rotor assembly comprising an outer portion surrounding an intermediate portion, an inner portion surrounded by the intermediate portion, first and second pairs of aligned flexural spring pivot means between the outer and intermediate portions and between the inner and intermediate portions respectively, the axes on which the two pairs of flexural spring pivots are aligned being perpendicular, and the flexural spring pivot comprising leaf spring members integral with or secured directly to the respective portions.

The inner portion of such an assembly is provided with a central axial bore within which a driving shaft is received and secured. The assembly is intended for use as a dynamically tuned free rotor gyro and is convenient to manufacture and has good performance characteristics. In certain contexts it is however desirable to reduce the inertia of the gimbal portion, which is one of the factors affecting the performance of the gyroscope. The gimbal inertia can be expressed as a quantity $h = i + j - k$, where $i$ and $j$ are the moments of inertia of the gimbal about two mutually perpendicular transverse axes, and $k$ is its polar moment of inertia. The quantity $h$ is proportional to the area of the gimbal, viewed along its polar axis, and to the cube of its thickness if the thickness and material of the gimbal is uniform. The lower the value of $h$, the better is the performance of the gyroscope. With the portions cut from a flat disc, the thickness of which cannot be reduced beyond a certain limit dictated by the form of the flexural spring pivots and the necessary rigidity that the gimbal must possess, a reduction in inertia necessitates a reduction in the area of that part of the disc which goes to make up the gimbal portion. The major object of the present invention is accordingly to provide an improved form of the dynamically tuned free rotor gyroscope construction disclosed and claimed in U.S. application Ser. No. 529,751 and the recently filed continuation-in-part application based thereupon by which a substantial reduction in the inertia of the gimbal portion can be obtained.

The invention accordingly provides a gyro rotor assembly having a rotor member surrounding a gimbal member, the gimbal and rotor member being connected by a first pair of aligned flexural spring pivot means, and means for mounting the assembly on a shaft, the mounting means having members located between the rotor and gimbal members and connected to the gimbal member by a second pair of flexural spring pivot means aligned on an axis at right angles to the alignment axis of the first pair.

Such an assembly affords the desired reduction in the inertia of the gimbal portion partly because the area of the gimbal portion is distributed more closely around the central axis and partly because its shape provides a more favourable ratio of strength to inertia than the earlier construction.

The mounting member includes a bridge or yoke portion spaced axially from the gimbal member for connection to a driving shift, which can extend through a central aperture in the gimbal portion. The gimbal and rotor portions and the spaced mounting portions are conveniently formed from a single metal disc, the gimbal portion having four arms extending to the edge of the disc, with one opposed pair of the portions therebetween forming part of the rotor portion and the other pair constituting the mounting portions. The assembly thus constitutes a modification of the assemblies disclosed in the previously referenced U.S. applications in which the components are re-arranged to afford the reduced gimbal portion area desired.

Figure 2:
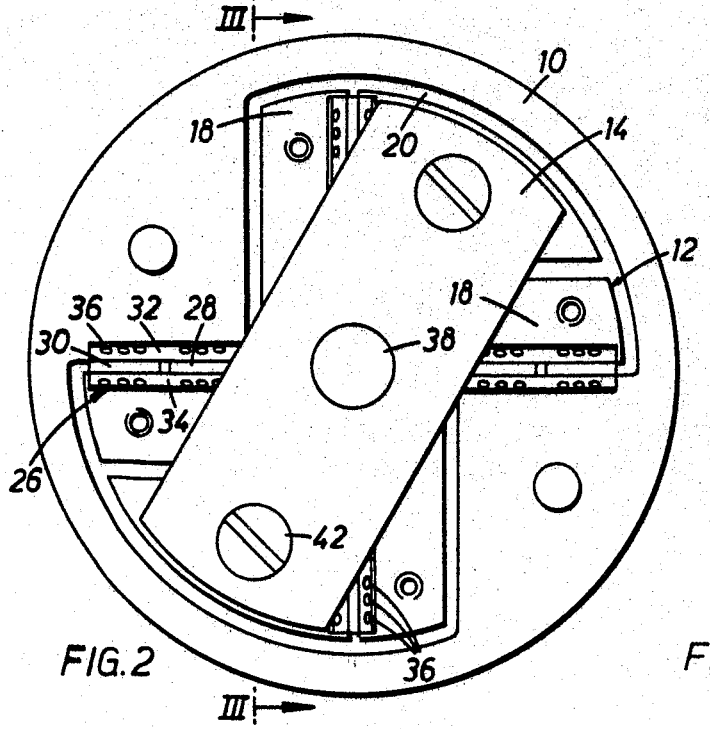
Figure 3:
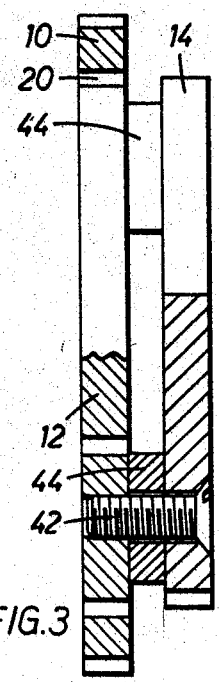

By way of example, only a gyro rotor assembly embodying the invention is described below with reference to the accompanying drawing, in which:

FIG. 1 is a front view of the assembly;
FIG. 2 is a rear view of the assembly; and
FIG. 3 is a sectional side view of the assembly taken on the line III—III of FIG. 2.

The gyro rottor assembly illustrated comprises an outer member 10, a gimbal member 12 and a mounting means. The mounting means consists of a bridge 14 connecting two mounting portions 16 both located between the gimbal member 12 and the rotor member 10. The rotor member 10, the gimbal member 12 and the two mounting members 16 will be seen to be so located as to form a disc, with slots separating adjacent members.

The outer rim of the disc is constituted by rotor member 10 and the gimbal member 12 occupies its central region. The gimbal member 12 is provided with four arms 18 extending outwardly from the central region towards the rotor member 10, the ends of the arms being separated from this member by two narrow arcuate slots 20 which are centred on the centre of the disc; they extend across the ends of the adjacent pair of arms 18. Of the four portions of the disc between the arms 18, two diametrally opposed portions 22 are integral parts of the rotor member 10 (they could instead be firmly secured to the rotor member), and the other pair constitute the mounting portions 16. The arms 18 do not extend radially but each has a side defined by a slot 24 extending radially.

Accross each of these four slots 24 extends a flexural spring pivot means 26 by which the gimbal member 12 is connected to the rotor member 10 and to the mounting members 16. Each flexural spring pivot means 26 comprises a crossed pair of spring leaf members or strips 28, 30 of rolled or otherwise suitably prepared spring material. The edge portions of both the members adjacent to the strips are levelled to provide aligned securement faces for the spring strips, the strip 28 of the crossed pair being secured to a face of one member on one side of the assembly and to the face of the other member on the other side of the assembly, and the other strip 30 of the pair being secured to the two remaining faces at a position radially outwards of the strip 28. The spring strips 28, 30 are sandwiched between the securement faces of the members and clamping elements 32, 34. The clamping elements, spring strips and members are held together by spot welding indicated by the reference numeral 36.

The assembly is mounted on a driving shaft (not shown) by means of the bridge 14 which extends diametrally on one side of the disc and is secured to the mounting portions 16 at its ends. The bridge 14 has an aperture 38 at its centre for reception of and securement to the driving shaft. The gimbal member 12 can be provided as shown with a central aperture 40 through which the driving shaft can extend with clearance if the shaft does not end at the bridge 14. To allow for relative movement of the rotor member 10 and the mounting members 16, the bridge 14 is axially spaced from the mounting members portions. The mounting members 16 are each drilled and tapped to receive a bolt 42 extending through an aligned drilled and countersunk hole in the bridge 14. a washer-like spacing member 44 being received on the shank of the bolt between the adjacent faces of the bridge and the mounting member.

The assembly is preferably produced as described in the previously designated U.S. applications. Thus the clamping elements can be welded in place on the members over end portions which are not to overtie the spring strips before the latter are put in place. The material of one or both of the elements can be then removed by etching, spark erosion or other suitable means so as to obtain a precisely located edge. The location of the edge of the effective portions of the spring strips is important for the properties of the assembly and greater precision can be obtained by removal of the material clamping elements than by mere precise positioning. The two clamping elements of each spring pivot means on one side of the assembly can be made from a single element of L-shaped section, the removal of material effecting the necessary division into the two elements. Moreover, the rotor and gimbal members and the mounting members can be formed from a single disc-shaped piece of metal, the portions of the slots across which the crossed leaf springs are to extend being cut and the leaf springs secured in place before the slots are extended to separate the various portions of the disc. In producing the present assembly, the additional step of securing the bridge to the mounting members is preferably performed before the final separation of the various parts of the disc. To ensure permanent rigidity, the mounting means, the bridge, the bolts and the spacing members are preferably secured together by means of a suitable adhesive (for example, Araldite) before the engraving operation by which the disc is finally divided.

In the foregoing description, the present invention has been described as embodied in a modification of the gyro-rotor assembly of the previously mentioned continuation-in-part application. It will be understood however that it can be readily embodied as a modification of other such assemblies with appropriate changes in the production methods. As will be evident, the present invention can in fact be embodied in a variety of ways other than as described.

We claim:

1. A gyroscope rotor assembly comprising a gimbal member, a rotor member around said gimbal member, a first pair of aligned flexural spring pivot means connecting the gimbal and rotor members, mounting means for mounting the assembly on a shaft rotatable to spin the assembly, said mounting means including a pair of spaced portions and a bridge portion bridging the spaced portions, and a second pair of flexural spring pivot means aligned on an axis at right angles to the alignment axis of the first pair, each of said spring pivot means of the second pair connecting a respective one of said spaced portions to said gimbal member, and said gimbal and mounting members being at least substantially coplanar plate-like members.

2. The assembly as claimed in claim 1 additionally comprising spacing means inserted between the bridge portion and each of the spaced portions to axially space the bridge portion from the spaced portions.

3. The assembly as claimed in claim 1 wherein said bridge portion is apertured to receive the shaft therethrough and said gimbal member includes a further aperture aligned with the aperture in said bridge portion and is of a size to receive the shaft therethrough with clearance.

4. The assembly as claimed in claim 1 or 3 wherein said gimbal member includes four outwardly extending arm portions forming opposed pairs of spaces therebetween, one edge of each arm portion having one side of a respective one of said flexural spring pivot means secured thereto, one opposed pair of the spaces between said arm portions being occupied by portions of the rotor member, and the other pair of the spaces being occupied by the spaced portions of the mounting means.

5. The assembly as claimed in claim 1 or 3 wherein each flexural pivot means comprises a pair of radially adjacent spring strips crossing on the pivot axis and secured directly to the members.

6. The assembly as claimed in claim 5 additionally comprising clamping elements overlying the edges of the spring strips to the members.

7. The assembly as claimed in claim 1 wherein the rotor member, the gimbal member and the spaced portions of the mounting means are spaced apart by slots of uniform width.

References Cited

UNITED STATES PATENTS

| | | | |
|---|---|---|---|
| 2,581,965 | 1/1952 | Miller | 74—5 |
| 2,797,580 | 7/1957 | Taylor | 74—5 |
| 3,081,552 | 3/1963 | Reason | 74—5 |
| 3,211,011 | 10/1965 | Litty | 74—5 |
| 3,264,880 | 8/1966 | Fischel | 74—5 |
| 3,354,726 | 11/1967 | Krupick et al. | 74—5.6 |

FRED C. MATTERN, JR., Primary Examiner

F. D. SHOEMAKER, Assistant Examiner